UNITED STATES PATENT OFFICE.

WALTER R. EMIG, OF TOLEDO, OHIO, ASSIGNOR OF ONE-HALF TO HARRY S. BERGEN, OF TOLEDO, OHIO.

RUST-PROOFING COMPOSITION.

1,381,112.  Specification of Letters Patent.  Patented June 14, 1921.

No Drawing.  Application filed August 5, 1918. Serial No. 248,456.

*To all whom it may concern:*

Be it known that I, WALTER R. EMIG, a citizen of the United States, residing at Toledo, in the county of Lucas, State of Ohio, have invented certain new and useful Improvements in Rust-Proofing Compositions, of which the following is a specification.

My improved composition is in the nature of an emulsion containing certain gums dissolved in suitable solvents and certain insoluble matters suspended therein. In order to form the composition I form a solution of the gums and solvents and separately therefrom an emulsion and a paste of the inorganic matters in similar solvents and then mix the compounds or materials in proper proportion to form the rust proofing compound.

The solution referred to above is formed by dissolving—

10.62% gilsonite,
10.62% kauri nubs,
5.33% China wood oil,
7.43% turpentine,
66% mineral spirits.

The second compound or emulsion is composed of—

9 gals. China wood oil,
4 gals. Japan drier,
25 lbs. asbestine,
25 lbs. lamp black,
25 lbs. lithopone,
30 lbs. black oxid of manganese.

A third ingredient consists of a mixture of iron filings with sufficient phosphoric acid U. S. P. to reduce it to a paste the consistency of vaseline.

These three compositions are mixed in the proportion of 65% of the first mentioned, 30% of the 2nd mentioned, and 5% of the third mentioned. The third mentioned ingredient should be compounded and added after the first two have been mixed together.

Each of the mixtures is formed with a suitable amount of stirring and after all of them have been mixed together they should be stirred or agitated a sufficient time to secure a perfect emulsion. The material is then ready for use.

It may be explained that kauri nubs is a gum exported from India, and asbestine a silicate of magnesia. Each of these materials as well as the others whose names are more familiar are well-known articles of commerce.

It will be apparent that the precise portions given above of the various ingredients may be departed from and materials recognized in the arts as equivalents of some of the ingredients substituted therefor without departing from my invention.

I claim:

1. A rust proofing compound comprising a solution of gilsonite and kauri nubs mixed with asbestine, lamp black, lithopone, black oxid of manganese and a mixture of phosphoric acid and iron filings.

2. A rust proofing composition comprising the following:

Gilsonite about 7%,
Kauri nubs about 7%,
China wood oil about $5\frac{2}{3}$%,
Turpentine about 5%,
Mineral spirit about 43%,
Japan drier about 1%,
Asbestine about $6\frac{1}{3}$%,
Lamp black about $6\frac{1}{3}$%,
Lithopone about $6\frac{1}{3}$%,
$MnO_2$ about $7\frac{5}{8}$%,
Iron filings and phosphoric acid paste about 5%.

WALTER R. EMIG.